No. 735,622. PATENTED AUG. 4, 1903.
J. H. TOOLE.
CUSHION TIRE.
APPLICATION FILED APR. 10, 1903.
NO MODEL.

Witnesses:
Harry L. Clapp
Alberta Adamick

Inventor:
John H. Toole
By Fred Gerlach
his Attorney.

No. 735,622.

Patented August 4, 1903.

UNITED STATES PATENT OFFICE.

JOHN H. TOOLE, OF CHICAGO, ILLINOIS.

CUSHION-TIRE.

SPECIFICATION forming part of Letters Patent No. 735,622, dated August 4, 1903.

Application filed April 10, 1903. Serial No. 151,984. (No model.)

*To all whom it may concern:*

Be it known that I, JOHN H. TOOLE, a resident of the city of Chicago, in the county of Cook and State of Illinois, have invented certain new and useful Improvements in Cushion-Tires, of which the following is a full, clear, and exact description.

The invention relates to vehicle-tires in which an elastic strip or body is employed, and designs to provide improved means whereby the elastic strip will be secured in the rim and particularly against lateral displacement.

The invention consists in the novel construction hereinafter described and more particularly defined by claims at the conclusion hereof.

Figure 1:
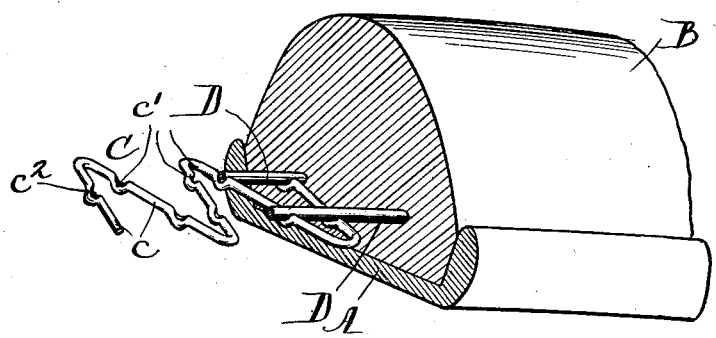
Figure 2:
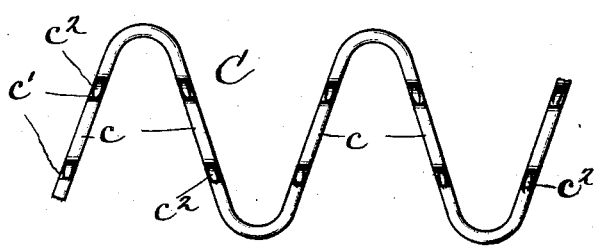
Figure 3:
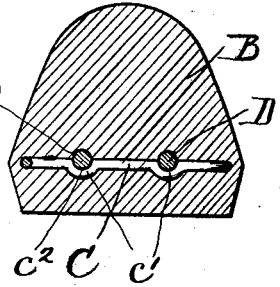

In the drawings, Figure 1 is a perspective of a portion of a wheel having the improved tire applied thereto. Fig. 2 is a plan view of a portion of the retaining-band support. Fig. 3 is a cross-section of the tire.

A denotes a metallic rim of usual construction and having a channel in its outer side, which forms an annular seat wherein an elastic strip or body B is secured. A sinuously-extending strip of wire C is embedded in elastic body and adjacent the base portion thereof and forms a cross-support for one or more retaining bands or wires D, which extend longitudinally through bores or openings in the elastic strip and secure the strip against outward movement. Cross-support C is preferably formed of a strip of round wire bent to form continuous portions or bars $c$, extending alternately back and forth across the strip and extending longitudinally through the strip and parallel to the base of the strip. The cross-bars of support C are indented or bent to form a series of alined open seats $c'$, wherein each retaining-band will rest, and thereby the band will be effectively and securely held in the elastic strip and against lateral movement in either direction. These seats are formed so the bar portion at each side thereof is slightly farther from the base than the depression to secure the retaining-bands against lateral movement in either direction, to prevent cutting of the elastic strip or body by the metallic retaining-bands.

In practice the tire is subjected to lateral pressure or strain in both directions, and the seats $c'$ provide simple means for securing the bands and preventing cutting of the elastic strip. In forming the depressions $c'$ the dies employed flatten the upper surface of the lowest portion of the seat and provide a flat surface which fits around the band, as shown at $c^2$. The bars $c$ are extended in a plane within the outer periphery of the retaining-band, and thus do not lessen the resiliency of the strip and more particularly that portion between the retaining-band and the treads.

Having described the invention, what I claim as new, and desire to secure by Letters Patent, is—

1. The combination with a rim having a channel therein, of an elastic strip or body held in said channel, a retaining-band extending longitudinally through said strip or body, and a cross-support formed of a strip of wire bent to extend continuously and alternately back and forth across the elastic strip or body, the transverse portions being bent and depressed to form seats wherein the retaining-band will be held, the portions of the support at both sides of the band fitting against the side of the band, to secure the band against lateral movement in either direction.

2. The combination with a rim having a channel therein, of an elastic strip or body held in said channel, a retaining-band extending longitudinally through said strip or body, and a cross-support formed of a strip of wire bent to extend continuously and alternately back and forth across the elastic strip or body, the transverse portions being bent and depressed to form seats wherein the retaining-band will be held, the portions of the support at both sides of the band fitting against the side of the band, to secure the band against lateral movement in either direction, the depressed portions forming the seats, being compressed and flattened.

JOHN H. TOOLE.

Witnesses:
FRED GERLACH,
HARRY L. CLAPP.